United States Patent

Korn

[15] 3,659,217

[45] Apr. 25, 1972

[54] TWO CHANNEL STEREOPHONIC AMPLIFIER

[72] Inventor: Tadeusz Korn, 58 Rue Mercelis, Brussels, Belgium

[22] Filed: Aug. 25, 1969

[21] Appl. No.: 852,548

[30] Foreign Application Priority Data

Aug. 23, 1968 Belgium ................................719.878

[52] U.S. Cl. ................................330/175, 330/157, 333/74, 330/126

[51] Int. Cl. ..........................................................H03f 1/00

[58] Field of Search ....................333/74, 24 T; 330/175, 126

[56] References Cited

UNITED STATES PATENTS 1,918,393 7/1933 Holden .............................330/175 X 3,094,587 6/1963 Dow .........................................179/1

*Primary Examiner*—Nathan Kaufman

*Attorney*—Waters, Roditi, Schwartz & Nissen

[57] ABSTRACT

A two-channel amplifier comprising passive elements disposed in the form of a lattice said lattice comprising two diagonally disposed low-pass filters connected respectively between one channel and the other channel, the lattice further comprising two attenuators connected respectively between the input of the first filter and the output of the second filter and between the input of the second filter and the output of the first filter, the degree of attenuation of each attenuator being made equal to the residual attenuation of the low-pass filters in their low-frequency band.

2 Claims, 6 Drawing Figures

TWO CHANNEL STEREOPHONIC AMPLIFIER

My invention relates to two-channel stereophonic amplifiers and more particularly to devices in which low frequency signals are reproduced at both outputs of the amplifier with the same phase and amplitude, irrespective of the channel to whose input the low-frequency signal is applied.

The interest of such an arrangement is obvious in the reproduction of a stereophonic programme: it can increase the electric and/or acoustic output of the low-frequency circuit without impairing the stereophonic effect, since it is known that the low-frequency components do not contribute to said effect.

According to the invention there is provided a two-channel amplifier for stereophonic reproduction, comprising a low-pass selective device for balancing the signals at low frequencies at the outputs of the two channels irrespective of whether the source of the signals is the input of one or the other channel, said low-pass selection device having a separate input and output for each channel, and comprising a passive low-pass filter connecting the input for one channel of the device with the output of the other channel of the device, a further low-pass filter connecting the input for said other channel with the output for said one channel, and two attenuators each connected between the input and the output for a different one of said channels, the degree of attenuation of each attenuator being made equal to the residual attenuation of the low-pass filters in their low-frequency band.

An embodiment of the invention will now be described with reference to the accompanying drawings wherein.

Figure 1A:
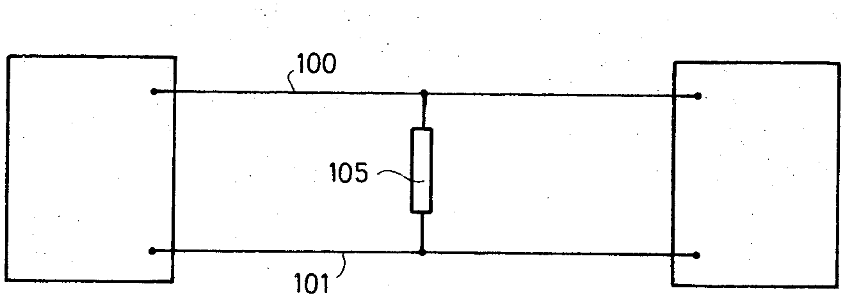
FIG. 1 is a block diagram of a two-channel stereophonic amplifier to which the invention is applied.
Figure 1B:
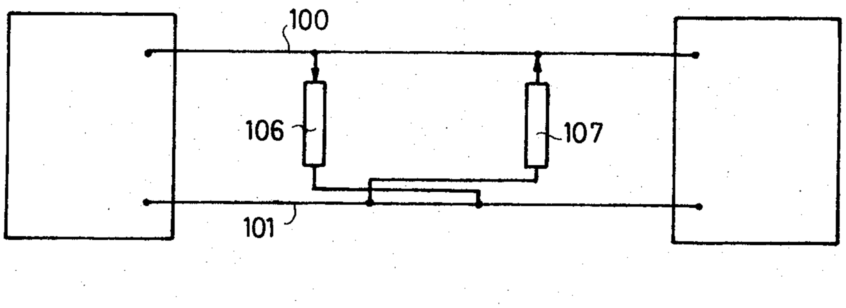

FIG. 1*a* is a block diagram of one prior art amplifier;

FIG. 1*b* is a block diagram of another prior art amplifier, and

Figure 1C:
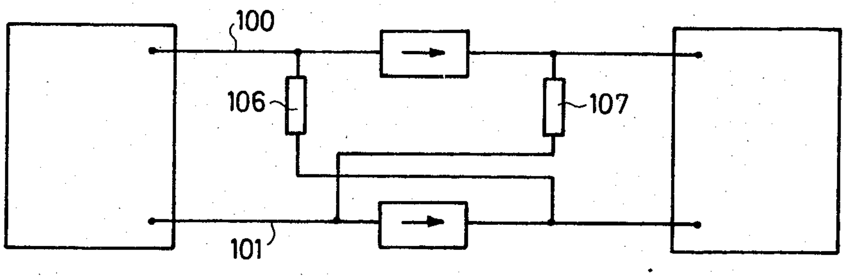

FIG. 1*c* is a block diagram of yet another prior art amplifier.

Figure 1:
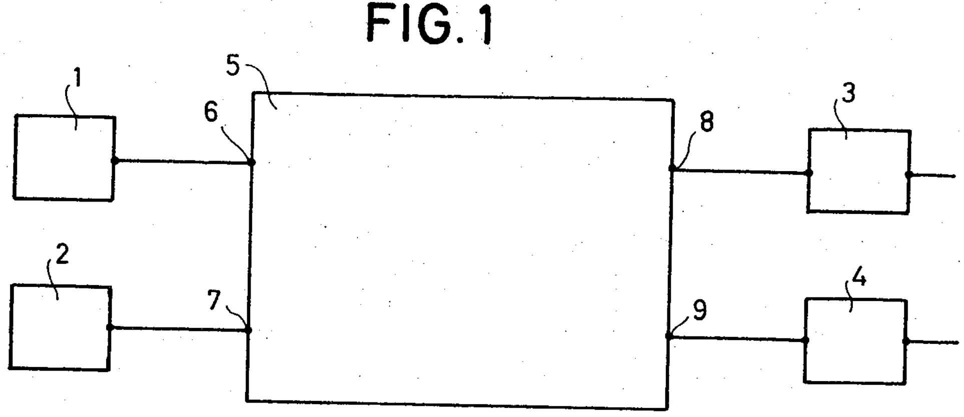

In FIG. 1, blocks 1 and 2 represent the parts of the stereophonic reproduction system comprising the signal sources for the left and right channel respectively, whereas blocks 3 and 4 represent the continuation of the respective channels of the system.

A diagrammatically shown balancing device 5 has an input 6 and 7 and an output 8 and 9 for the left and right channels respectively; the device 5 is arranged to provide the same electric signal voltage at low frequencies at the outputs 8 and 9 irrespective of whether the signal source is the block 1 or the block 2. At medium and high frequencies, however, the device 5 separates the signals in the two channels as required.

The object of the invention is to have a device which makes possible obtaining an absolutely perfect balancing of the two channels at the low frequencies while keeping a strong separation of the signals at medium frequencies. Such an absolutely rigorous balancing at low frequency is necessary not only to optimize the electro acoustical efficiency of the system but also to eliminate the vertical rumble of turntables.

Various amplifiers have already been proposed for producing the same effect but none of them provide perfect balancing of the low-frequency signals.

It has been proposed, for example, (see FIG. 1*a*) to connect the two stereophonic channels 100 and 101 by a low-pass filter 105 disposed so that the two loudspeakers connected to the two channels are supplied in parallel at low frequencies whereas, at higher frequencies, the signals are separated or divided between the two channels.

It is manifestly impossible, however, to construct a reasonably priced filter which can simultaneously give insignificant attenuation in its pass-band and strong attenuation in the band of frequencies to be separated.

In another previously proposed amplifier shown in FIG. 1*b* the two stereophonic channels 100–101 are connected by two low-pass filters 106–107.

A closer examination of this proposed amplifier however, shows that when filters 106 and 107 are of passive and therefore reversible type, the arrows indicating the direction of the signals lose any significance and the proposed device is reduced to a simple arrangement in parallel of two identical filters having a combined action of the same nature as the action of a single filter as in FIG. 1*a*. If, on the other hand, filters 106 and 107 are of the active type, i.e. if they comprise amplifying elements to ensure that the filters are unidirectional, it is impossible to balance the channels at low frequencies without causing interfering self oscillations (Nyquist's criterion). There is a similar risk of oscillations, when, as shown in FIG. 1*c*, the input of filter 106 and the output of filter 107 and, respectively, the input of filter 107 and the output of filter 106 are separated by active elements such as amplifier stages.

Figure 2:
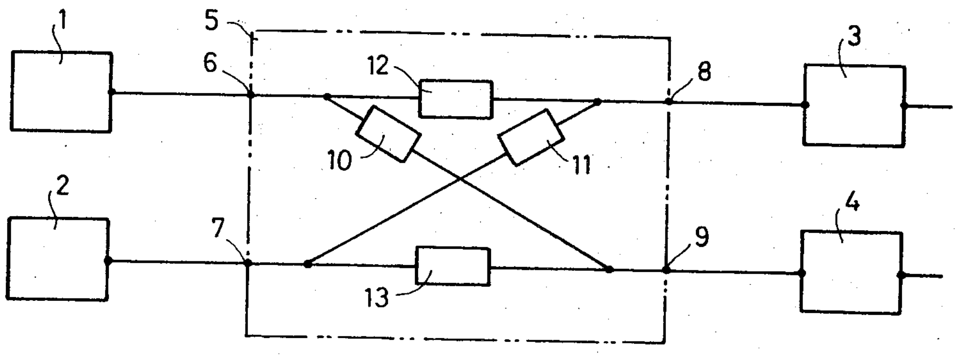
FIG. 2 is a detailed block diagram of the amplifier according to the invention.
Figure 3:
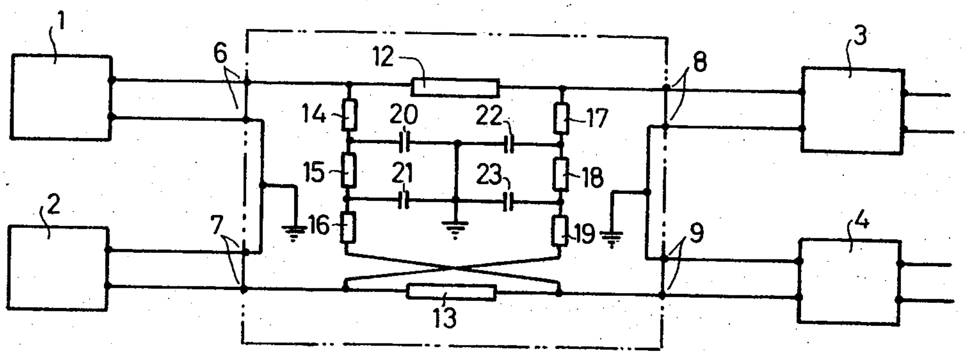
FIG. 3 is a diagram similar to FIG. 2 but showing a circuit diagram of the circuit within one of the blocks.

The amplifier according to the invention and shown in FIGS. 2 and 3, differs from those already described in that it comprises passive elements disposed in the form of a lattice as shown in FIG. 2, the lattice comprising two low-pass filters 10 and 11 connected between the input 6 and the output 9, and between the input 7 and the output 8 of the device 5, respectively. The lattice further comprises two attenuators 12 and 13 connected between the input 6 and output 8, and between the input 7 and the output 9 of the device 5 respectively. Each attenuator has a degree of attenuation which is made equal to the residual attenuation of the low-pass filters in their low-frequency band.

The device 5 provides an exact balance (or even an over-compensation) at low-frequencies and a desired separation gradient as a function of the frequency. Thus the signal voltage at the output of filter 10 is exactly equal to the voltage at the output of filter 11, irrespective of the channel in the stereophonic source in which the source of the low-frequency signal occurs.

As shown in FIG. 3, filters 10 and 11 each comprise a plurality of resistance capacitance networks, the filter 10 being made up of resistances 14, 15 and 16 and capacitors 20 and 21 and the filter 11 being made up of resistance 17, 18 and 19 and capacitors 22 and 23. The attenuators 12 and 13 are in the form of variable resistances inserted in the signal-bearing wires in the left and right channels respectively. Each of the attenuator resistors 12 and 13 has a value equal to the sum of the values of the resistors 14, 15 and 16 or 17, 18 and 19 both sums being equal.

The ratio of resistances 12, 13 and of the sum of resistances 14 to 19 with respect to the input impedance of blocks 3 and 4 remains a problem. In the device 5, the ratio is made small so that the device does not undesirably amplify low frequencies when the low-frequency source is in both blocks 1 and 2.

What I claim is:

1. A two-channel amplifier for stereophonic reproduction having input and output stages and comprising a low-pass selective device between the input and output stages for balancing the signals at low frequencies in the two channels irrespective of whether the source of those signals is at the input stage of one or the other channel, said low-pass selective device comprising two low-pass passive filters, said channels including a left and a right channel, a first of said filters having its input connected to the output of the input stage of the left channel and its output connected to the input of the output stage of the right channel, the second of said filters having its input connected to the output of the input stage of the right channel and its output connected to the input of the output stage of the left channel, an attenuator included in the left channel and connected between said input of the first filter and said output of the second filter, a further attenuator included in the right channel and connected between said input of the second filter and said output of the first filter, said filters and said attenuators being comprised in a lattice, each attenuator having a degree of attenuation which is made equal to the residual attenuation of the low-pass filters in their low frequency, the said arrangement providing an exact balance at low frequencies and the desired separation gradient as a function of the frequency, each of said low-pass filters comprising a plurality of series resistors and shunt condensers, each attenuator comprising a series resistor whose value is equal to the sum of series resistances in each of said low-pass filters.

2. An amplifier according to claim 1, wherein the value of the said attenuating resistances is lower than the input impedances of the output stages.

* * * * *